Patented Jan. 28, 1930

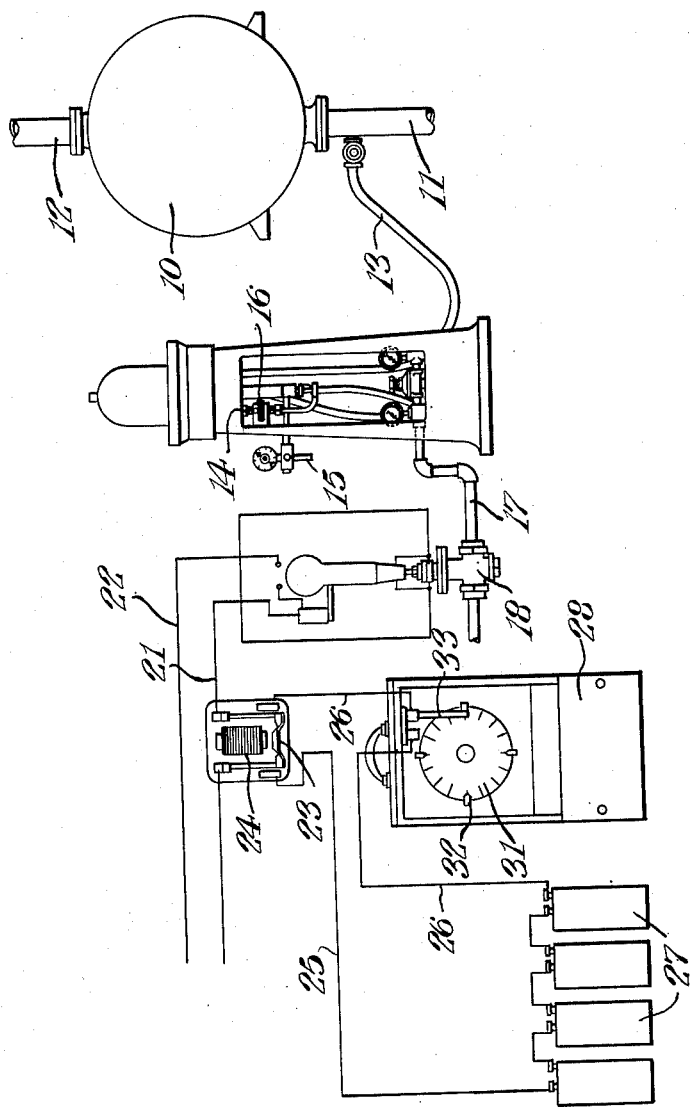

1,745,141

UNITED STATES PATENT OFFICE

JOHN C. BAKER, OF NUTLEY, NEW JERSEY, ASSIGNOR TO WALLACE & TIERNAN PRODUCTS, INC., OF BELLEVILLE, NEW JERSEY, A CORPORATION OF NEW JERSEY

METHOD OF PREVENTING THE FORMATION OF SCUMS AND FILMS DUE TO THE GROWTH OF ORGANISMS ON SURFACES IN CONTACT WITH WATER

Application filed July 21, 1927, Serial No. 207,341. Renewed November 14, 1929.

The main object of this invention is to provide a method of preventing the formation of films and slimes in condensers, such as are used commonly in power plants to condense the steam on the discharge side of an engine, thereby producing a vacuum which increases the efficiency of the engine.

It is a matter of common knowledge that cold water passing through the condenser tubes will form a deposit on the surfaces of the condenser tubes making it necessary to open the condenser periodically and clean out the tubes. In order to do this the entire power unit must be closed down with a resulting loss in efficiency and increased cost of labor.

The deposit mentioned is due to the fact that the water circulated through the condenser contains many organisms which deposit on the cooling surfaces of the condenser and which by growth and accumulation of adhering matter form films and scums of sufficient quantity on the cooling surface to interfere with the efficiency of the apparatus. I have found and proven by numerous experiments that the formation of such films and slimes can be prevented by the application of chlorine in relatively minute amounts to the water flowing through the condenser. The simplest way of doing this is to keep the circulating water constantly supplied with enough chlorine to satisfy the capacity of the water to neutralize chlorine and leave a slight excess or residual amount in the water. In order to carry out this idea, however, more chlorine must be employed than is actually necessary (8 to 12 pounds per million gallons) and the cost of the chlorine will in large part offset the saving which is effected by making it unnecessary to shut down the power unit for periodical cleansing of the condenser.

I have found by further experiments that the same result can be effected by an intermittent application of the chlorine, thereby preventing the formation of films and scums just as effectively as with a continuous application of chlorine; and with a very materially reduced cost for the chlorine.

This intermittent applicaton of the chlorine might be made by periodically injecting into the cooling current of water a previously prepared and stored solution of chlorine and water, but I prefer to make the intermittent injection of chlorine direct from a chlorine supply.

In the accompanying drawing there is illustrated in somewhat diagrammatic form, an apparatus for practicing the invention according to the scheme last mentioned above; that is intermittently injecting the chlorine directly from a chlorine supply into the circulating water in the condenser.

In said drawing a condenser is represented at 10 with the water circulating pipes 11 and 12 connected to cause the water to flow through the usual water tubes (not shown) in the condenser. A valved pipe 13 connects the water inlet pipe 11 of the water circulating system and a chlorinator 14 of the kind fully shown and described in United States Patent No. 1,514,939 issued November 11, 1924, to Charles F. Wallace. Such chlorinators are in wide general use in water purification systems for cities and towns and need not be described in detail, it being sufficient to say that in use the chlorinator is connected as at 15 to a chlorine container (not shown), the clorine passing from 15 through a supply pipe containing an adjustment 16 controlling a needle valve to regulate the flow of chlorine from the container. The adjustment and needle valve are fully described in the Wallace patent mentioned. When the apparatus is running chlorine is drawn from the chlorinator 14 in measured quantities by a water circulating system including the pipe 17 and an aspirator (not shown) and the chlorine bearing water then transmitted by a pipe such as the pipe 13 to the point of application.

In the present embodiment the flow of the chlorine withdrawing current of water is controlled by an electrically operated valve 18. This valve may be of the electrically controlled, motor operated type, but it is preferred to use the simpler solenoid type. Both types of valves are well known.

The electrical apparatus for operating the valve 18 includes lines 21 and 22 connected to a power line and having in one of the lines a circuit closing armature 23 cooperating with a solenoid 24. The solenoid 24 is connected by lines 25 and 26 to batteries 27, with what is known commercially as a program clock in the line 26 and controlling the flow of current from the batteries to the solenoid.

The program clock, designated generally by the numeral 28, comprises the usual disk 31 driven by the clock mechanism and having radially extending slots adapted to receive and hold switch operating elements 32 cooperating with a pair of contacts, the nearest one of which is shown at 33. When one of the elements 32 contacts with the movable element of the contact 33 the circuit is closed through the lines 25, 26 and the solenoid 24 to cause the armature 23 to establish a circuit through the solenoid mechanism of the valve 18. When the circuit is opened by the passage of the element 32 out of engagement with contacts 33 the circuit is broken and the solenoid control valve 18 is closed.

In testing out installations of the kind described I have found that under average conditions application of chlorine of ¾ of a part per million for an interval of one minute followed by an off period of 10 minutes is effective, but variations from average conditions can be taken care of by regulating the supply of chlorine by the adjustment 16 or by changing the duration of the time of application or the interval between applications by disposition of the elements 32 on the program disk 31 of the clock 28. The apparatus is, therefore, a highly flexible one so far as meeting varying conditions is concerned.

I do not wish to be confined to any stated period of time during which the application of chlorine is off and on. Experience with a particular water supply will readily show the amount of chlorine necessary to accomplish the purpose stated without waste or unnecessary expense for chlorine. All that is necessary is to apply the chlorine often enough and in sufficient quantity to prevent the deposit and growth of organisms on the condenser surface and incidently destroy the food supply in the water for such organisms.

As stated above, the intermittent injection direct from a chlorine supply is preferred. However, the chlorine solution may, instead of being injected directly into the condenser, first be passed over limestone to produce a hypochlorous acid as described in Baker Patent No. 1,413,153 or the chlorine may be first caused to produce hypochlorite solutions by employing the process disclosed in Wallace & Baker Patent No. 1,403,993; and the resulting solutions then injected or added to the water circulated through the condenser. Or, previously prepared calcium or other metal hypochlorides may be applied intermittently in the same manner as chlorine. All of these solutions are ones which have the chlorine available for sterilization and their use instead of chlorine drawn directly from a chlorine container will not in any way change the practice in other respects.

In plants where the condenser is not in continuous operation it is advisable to see that the water left standing in the condenser contains enough chlorine to prevent the growth of organisms. This may be effected in any desired way as, for example, by manually closing the contacts 33 to open the valve 18 and hold the valve open until the water in the condenser tubes contains the required amount of chlorine to keep the condenser in sterile condition until its operation is resumed.

While the invention has been explained in connection with condensers, it is obvious that it has a much wider application, as the idea can be employed with suitable modifications and changes whenever it is found desirable to prevent the formation of films and slimes on surfaces in contact with water. For example, the trouble experienced in paper mills from slimes in the pulp, in stock tanks, and, to a certain extent, on the making wire, may be prevented by the application of chlorine intermittently to the mixing box where the dilution water is added, or, where the white water is returned to the pulp stream, by the application of the chlorine intermittently to the white water. This will ordinarily be sufficient to prevent the formation of slime and scums, and thereby do away with the weak or defective spots in the paper caused by the slime accumulating on the pulp fibers or being dislodged and carried to the making wire. Where stock tanks for pulp are employed, the chlorine may be applied to them in the same way and in substantially the same quantities as stated above when describing the operation in connection with a condenser.

As another example the chlorine may be applied in the manner stated to the water supplied in the fruit washers employed in many large fruit packing plants.

From the foregoing it is apparent that the process may be carried out in a great many ways and that a number of instrumentalities differing from the ones shown and described may be employed. It is, therefore, not the desire to be limited in any respect except as is indicated in the following claims.

What is claimed is:

1. The method of preventing the formation of films and scums on surfaces in contact with flowing water, which comprises adding to the water at regular intervals relatively minute quantities of chlorine.

2. The method of preventing the formation of films and slimes on the cooling surfaces of condensers and the like which comprises the intermittent application of chlorine to the water passing over said surfaces.

3. The method of preventing the formation of films and slimes on the cooling surfaces of condensers and the like which comprises adding chlorine intermittently to the water engaging said surfaces in quantities sufficient to satisfy the capacity of water to neutralize chlorine and provide a relatively minute residual amount of chlorine.

4. The method of preventing the formation of films and slimes on the cooling surfaces of condensers and the like which comprises the intermittent application of chlorine to the water passing through the condenser and maintaining the regularity of the intermittent applications while the condenser is in operation.

5. The method of preventing the formation of films and slimes on the cooling surfaces of condensers and the like which comprises the circulation of water through the condenser and intermittently adding to said water as it enters the condenser chlorine in sufficient quantities to satisfy the capacity of the water to neutralize chlorine and provide relatively minute amounts of residual chlorine.

6. The method of preventing the deposit and growth of slime forming organisms on the interior of condensers and the like which comprises applying chlorine in relatively minute amounts to the water flowing through the condenser for a predetermined period of time and stopping the application of chlorine for another and longer period of time while maintaining the flow of the water through the condenser, and varying the time duration of said periods according to the temperature of the condenser water and the slime forming properties of said water.

7. The method of preventing the deposit and growth of slime forming organisms on the interior of condensers and the like which comprises ascertaining the temperature of the condenser water and the slime forming properties of said water, intermittently applying chlorine in sufficient amounts to the condenser water as it passes through the condenser to satisfy the capacity of the water to neutralize chlorine and provide some residual chlorine, and maintaining the regularity of the intermittent applications of chlorine while the water is passing through the condenser.

8. The method of preventing the deposit and growth of slime forming organisms on the interior of condensers and the like which comprises applying to the condenser water ¾ of a part per million of chlorine for periods each of approximately one minute duration separated by substantially longer time intervals and maintaining the regularity of such intervals while the condenser is in operation.

9. The method of preventing the formation of films and slimes on the cooling surface of condensers and the like which comprises intermittently circulating over said surfaces water containing relatively minute amounts of residual chlorine.

10. The method of preventing the formation of films and slimes in apparatus such as condensers and the like which comprises the intermittent application of a liquid containing available chlorine to the liquids circulated in and through the apparatus, and maintaining the regularity of the intermittent applications while said circulation is being maintained.

11. The method of preventing the development of scums and slimes in apparatus of the kind in and through which a liquid is circulated, which comprises a regularly intermittent addition to such liquid of a liquid containing available chlorine, and maintaining the regularity of the intermittent additions while the circulation of the first named liquid is being maintained.

In testimony whereof I hereto affix my signature.

JOHN C. BAKER.